(12) United States Patent
Moody

(10) Patent No.: US 11,386,615 B2
(45) Date of Patent: *Jul. 12, 2022

(54) CREATING A CUSTOM THREE-DIMENSIONAL BODY SHAPE MODEL

(71) Applicant: Stitch Fix, Inc., San Francisco, CA (US)

(72) Inventor: Christopher Erick Moody, Oakland, CA (US)

(73) Assignee: Stitch Fix, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/227,170

(22) Filed: Apr. 9, 2021

(65) Prior Publication Data

US 2021/0272356 A1 Sep. 2, 2021

Related U.S. Application Data

(63) Continuation of application No. 16/297,445, filed on Mar. 8, 2019, now Pat. No. 11,062,508.

(51) Int. Cl.
| | |
|---|---|
| *G06K 9/00* | (2022.01) |
| *G06T 17/00* | (2006.01) |
| *A41H 1/02* | (2006.01) |
| *G06T 15/60* | (2006.01) |
| *G06T 7/174* | (2017.01) |
| *G06T 7/194* | (2017.01) |

(52) U.S. Cl.
CPC .............. *G06T 17/00* (2013.01); *A41H 1/02* (2013.01); *G06T 7/174* (2017.01); *G06T 7/194* (2017.01); *G06T 15/60* (2013.01); *G06T 2207/10024* (2013.01); *G06T 2207/10028* (2013.01); *G06T 2207/30201* (2013.01)

(58) Field of Classification Search
CPC ..................... G06T 17/00; G06T 15/60; G06T 2207/10024; G06T 2207/10028; G06T 2207/30201
USPC ........................................................ 382/111
See application file for complete search history.

(56) References Cited

U.S. PATENT DOCUMENTS

| | | | |
|---|---|---|---|
| 10,664,903 B1 | 5/2020 | Haitani | |
| 11,062,508 B1 * | 7/2021 | Moody | ................... G06T 15/60 |
| 2010/0111370 A1 * | 5/2010 | Black | ........................ G06T 7/75 |
| | | | 382/111 |
| 2016/0045317 A1 | 2/2016 | Lang | |
| 2017/0278272 A1 | 9/2017 | Ravindra | |
| 2018/0240280 A1 * | 8/2018 | Chen | ....................... G06T 7/564 |

(Continued)

OTHER PUBLICATIONS

Alldieck et al., "Video Based Reconstruction of 3D People Models", Apr. 16, 2018.

(Continued)

*Primary Examiner* — Gabriel I Garcia
(74) *Attorney, Agent, or Firm* — Van Pelt, Yi & James LLP

(57) ABSTRACT

A series of captured images of a user is received. Using a processor, the images are processed to identify a portion of each of the images corresponding to the user. Parameters of a predetermined three-dimensional human model are modified to fit a modified version of the predetermined three-dimensional human model across the identified portions of the images to determine a set of specific parameters representing a body profile of the user.

22 Claims, 16 Drawing Sheets

(56) References Cited

U.S. PATENT DOCUMENTS

2019/0035149 A1 1/2019 Chen
2019/0378277 A1 12/2019 Zhao

OTHER PUBLICATIONS

Choy et al., "Universal Correspondence Network", 30th Conference on Neural Information Processing Systems, 2016.
Ehlke et al., "Fast Generation of Virtual X-ray Images from Deformable Tetrahedral Meshes", Jul. 2013.
Güler et al., "DenseReg: Fully Convolutional Dense Shape Regression In-the-Wild", Jun. 19, 2017.
Joo et al., "Total Capture: A 3D Deformation Model for Tracking Faces, Hands, and Bodies" Jan. 5, 2018.
Kanazawa et al., "Learning Category-Specific Mesh Reconstruction from Image Collections", Jul. 30, 2018.
Kato et al., "Neural 3D Mesh Renderer", Nov. 20, 2017.
Kazhdan et al., "Poisson Surface Reconstruction", Eurographics Symposium on Geometry Processing, 2006.
Loper et al., "SMPL: A Skinned Multi-Person Linear Model", 2015.
Martinez et al., "A simple yet effective baseline for 3d human pose estimation", Aug. 4, 2017.
Newell et al., "Stacked Hourglass Networks for Human Pose Estimation", Jul. 26, 2016.
Rezende et al., "Unsupervised Learning of 3D Structure from Images", 29th Conference on Neural Information Processing System (NIPS 2016), Jun. 19, 2018.
Rocco et al., "Convolutional neural network architecture for geometric matching", Apr. 13, 2017.
Rocco et al., "End-to-end weakly-supervised semantic alignment", Apr. 24, 2018.
Sun et al., "Compositional Human Pose Regression", Aug. 2, 2017.
Thewlis et al., "Unsupervised learning of object landmarks by factorized spatial embeddings", 2017.
Tung et al., "Self-supervised Learning of Motion Capture", Dec. 4, 2017.
Varol et al., "Learning from Synthetic Humans", Jan. 19, 2018.
Vikinkoski et al., "Shape Reconstruction from Images: Pixel Fields and Fourier Transform", Inverse Problems and Imaging, vol. 8, No. 3, 2014.
Wang et al., "Attention-based Mixture Density Recurrent Networks for History-based Recommendation", Sep. 22, 2017.
Xu et al., "MonoPerfCap: Human Performance Capture from Monocular Video", ACM Transactions on Graphics, vol. 9, No. 4, Article Mar. 2, 39018.
Zhou et al., "Deep Kinematic Pose Regression", Sep. 17, 2016.

* cited by examiner

CREATING A CUSTOM THREE-DIMENSIONAL BODY SHAPE MODEL

CROSS REFERENCE TO OTHER APPLICATIONS

This application is a continuation of U.S. patent application Ser. No. 16/297,445, entitled CREATING A CUSTOM THREE-DIMENSIONAL BODY SHAPE MODEL filed Mar. 8, 2019 which is incorporated herein by reference for all purposes.

BACKGROUND OF THE INVENTION

Achieving proper clothing fit can be difficult. Sizing measurements for clothing and body sizes are typically limited to only a few parameters. For example, conventional shirt and torso sizing may span a limited number of discrete sizes ranging from extra-small to extra-large. These limited sizes lack precision. Two shirts (or bodies) with a medium size can be drastically different. More detailed measurements are possible and typically require a tailor to extensively measure a customer's anatomy. This is both time-consuming and tedious. And although a tailor's measurements can be accurate, clothing options are limited since it is difficult to identify readily available clothing that fits to the tailor's measurements. Instead, clothing must typically be custom made or individually altered to match these measurements. Therefore, there exists a need for a more accurate method for measuring clothing and body sizing that is applicable across a large variety of clothing options and body shapes.

BRIEF DESCRIPTION OF THE DRAWINGS

Various embodiments of the invention are disclosed in the following detailed description and the accompanying drawings.

DETAILED DESCRIPTION

Figure 1:
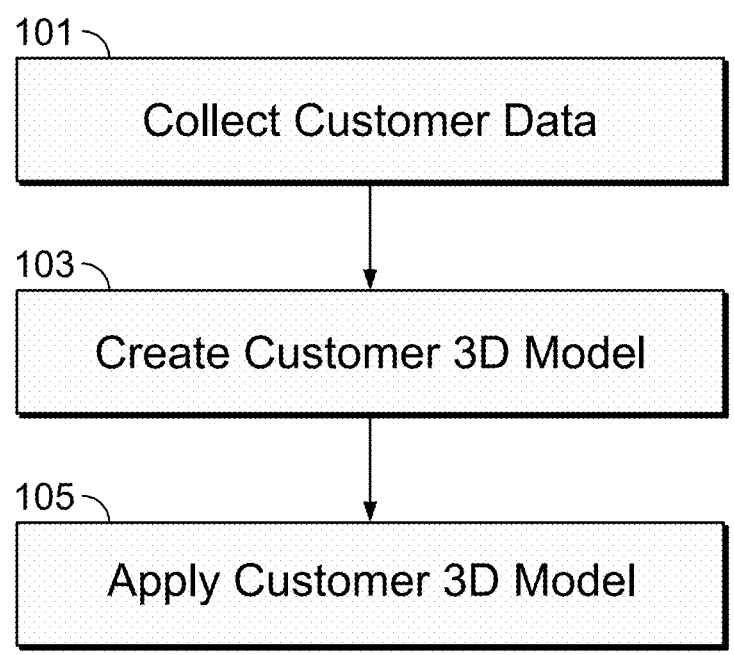
FIG. 1 is a flow chart illustrating an embodiment of a process for creating a custom three-dimensional model of a customer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to accurately and efficiently measure a body shape is disclosed. Using images of a user captured from a device, such as a smartphone camera, a three-dimensional human model is created. In some embodiments, the three-dimensional human model functions as a virtual body (or dress) form for rendering the fit of garments on a highly accurate model of the user. In some embodiments, the custom three-dimensional human model is generated by modifying parameters of a predetermined three-dimensional human model. The parameters are modified until the custom three-dimensional human model accurately represents the body profile of the user. For example, joints of the user are identified from images taken of the user and matched to joints in the three-dimensional model. Similarly, silhouettes extracted from images taken of the user are matched to rendered silhouettes of the generated three-dimensional model. Matching both joints and silhouettes results is a custom three-dimensional model based on the user's body profile. Once generated, a set of specific parameters that represent the body profile of the user can be extracted. This vector of parameters uniquely and efficiently defines the user's body profile and can be used for fit decisions, style decisions, matching the user with stylists, and/or inventory allocation and purchasing decisions, among other clothing and inventory related decisions.

In some embodiments, a series of captured images of a user is received. For example, a user captures a series of images of the user from a camera such as the user's smartphone camera. As another example, a series of images is extracted from video captured of the user. The series of images includes different poses of the user and captures the user from different profiles. In some embodiments, the images are processed using a processor to identify a portion of each of the images corresponding to the user. For example, the images are segmented to differentiate the foreground from the background, with the foreground portions corresponding to the user. In some embodiments, the segmentation process utilizes color information from the captured images. In some embodiments, a depth sensor is utilized and the captured images include corresponding depth information. The depth information is used to help identify the portion corresponding to the user. In some embodiments, parameters of a predetermined three-dimensional human model are modified to create a modified three-dimensional human model that fits the identified portions of the images corresponding to the user. For example, a predetermined three-dimensional human is used as a template to create a custom three-dimensional human model matching the user's body shape as determined from the captured images. In some embodiments, the modified model is created by matching silhouettes of the modified model to silhouettes of the identified user portions of the images. When the silhouettes match, the modified model accurately represents the user's body shape. In some embodiments, one step in creating the matching modified model is matching joint locations of the model to joint locations identified using the user portions of the images. In various embodiments, the custom model is created by modifying specific parameters that are applied to the predetermined three-dimensional human model. These parameters modify the model's height, width, leg length, width at hips, etc. The selection of these feature parameters may be optimized to minimize overlap between parameters and to reduce the total number of parameters required to describe a body shape. Once a modified model is created, a set of specific parameters representing a body profile of the user is determined. For example, the specific parameters used to modify the model are also used to represent the body profile of the user. In some embodiments, the parameters are stored as a client vector representing the user's body profile. The creation of a client vector has numerous applications. The applications include but are not limited to matching garments to fit a client, visualizing garments on a virtual representation of a client, matching stylists to clients with certain client vector characteristics, informing inventory allocation and purchases, and/or designing new garments to optimize the fit for potential clients.

FIG. 1 is a flow chart illustrating an embodiment of a process for creating a custom three-dimensional model of a customer. Using the process of FIG. 1, a custom three-dimensional model of a customer is created that accurately represents the body shape of the customer. The model is created in part from images captured of the customer. For example, customers can capture images or video of themselves using a camera such as a smartphone camera, tablet camera, or webcam. The process of FIG. 1 may be performed in part by using a mobile device and/or remote processing server. In some embodiments, the process of FIG. 1 is performed at least in part by using processor 1501 of computer system 1500 of FIG. 15 and images captured via camera 1515 of computer system 1500 of FIG. 15.

At 101, customer data is collected. For example, image data is captured of the customer using a camera such as a smartphone camera. The image data may be processed by the smartphone and/or transmitted and collected at a remote server for processing. In some embodiments, the image data is collected as video data. In various embodiments, different poses and body profiles of the customer are collected. Along with image data, in some embodiments, additional customer data is collected such as sizing measurements. Sizing measurements may include measurements such as shoe size, shirt size, torso, waist, inseam, and/or bust, among others. The additional customer data may be optionally collected to augment the collected image data. In various embodiments, customer information such as name, age, gender, sex, style preferences, price preferences, delivery options, etc. may be collected as well.

At 103, a three-dimensional model of the customer is created. Using the customer data collected at 101, in particular the image data collected, a three-dimensional model of the customer is created. The three-dimensional model is a custom model that accurately represents the body shape and profile of the customer. In some embodiments, the model is created by starting with a predetermined three-dimensional human model and modifying model parameters to fit the model to the customer's body shape. The modifications may be based on matching joint locations and the customer's silhouette from the captured images. In some embodiments, the customer can additionally manipulate the model to refine the accuracy of the model. For example, the customer can adjust the height, arm length, torso, etc. of the model to fit the customer's body profile, as appropriate. In some embodiments, the customer is presented with the generated model, for example, overlaid on the customer's image. The customer can analyze and review the accuracy of the model and make/suggest changes. In some embodiments, the customer can submit additional images highlighting areas that need refinement. For example, in the event the feet are not accurately modeled, the customer can submit additional images that include focused images of the customer's feet that can be used to refine the accuracy of the customer's model.

At 105, the created three-dimensional model of the customer is applied to one or more applications. In various embodiments, a set of specific parameters representing a body profile of the user is extracted from the created three-dimensional model of the customer. These parameters form a customer or client vector describing the customer's body shape. The client vector can be used for a variety of applications including identifying and recommending for purchase potential garments that fit well for the customer. For example, a value identifying a predicted size fit can be determined for a clothing item based on the customer's client vector. Using the client vector, the points of measure of the clothing item can be compared to the customer's body shape. A higher value for the predicted size fit indicates a higher likelihood the item fits the customer well and increases the probability the customer will purchase the item. In some embodiments, items with high values for the predicted size fit are provided to the customer to evaluate. For example, only items with a value identifying the predicted size fit that exceeds a minimum threshold value are provided to the customer for evaluation. The customer can rent and/or purchase the item after evaluating them. The client vector can also be used to identify and match particular stylists that have a history of successful results with customers with similar client vector profiles. For example, certain stylists are more aware of and may have more experience with the fit challenges faced by clients with particular client vector profiles. Certain stylists may also have better success metrics with customers with particular client vectors (e.g., finding well matched clothing). Additional applications include using client vectors for inventory purchasing decisions. For example, clothing items, lines, and/or brands that fit well based on client vector matches are identified and targeted for purchasing decisions while those that do not fit well may be avoided. As another application, clothing can be manufactured based on client vectors. Clothing can be designed and made for clients with client vectors whose demands are not well met by existing inventory options. In various embodiments, the applications can be applied to individual client vectors and/or clusters of client vectors. For example, client vectors are clustered and items are designed and made based on the body shape of the cluster.

In some embodiments, the customer's three-dimensional model is used to predict the customer's traditional points of measurement. For example, measurements made using the model can predict the measurements that a tailor would have taken by measuring the actual body of the customer. Instead, a virtual tape measure can be applied to the generated model to predict the same measurements.

In some embodiments, the customer's three-dimensional model is used as an avatar to visually demonstrate how clothing would appear on the customer. The accurately generated model allows the customer to see how different garments would fit including how well different materials and styles would drape on the customer's individual body shape. A three-dimensional model also allows the user to view the garments from all directions. The custom model also allows a customer to share a rendered model with an outfit combination with others, for example, to get opinions from friends and family on purchasing decisions or to share the excitement of a recent purchase. The ease of viewing different clothing items on the costumer's body greatly improves the customer purchasing experience. Customers can virtually try on many more different garments than would otherwise be possible.

Figure 2:
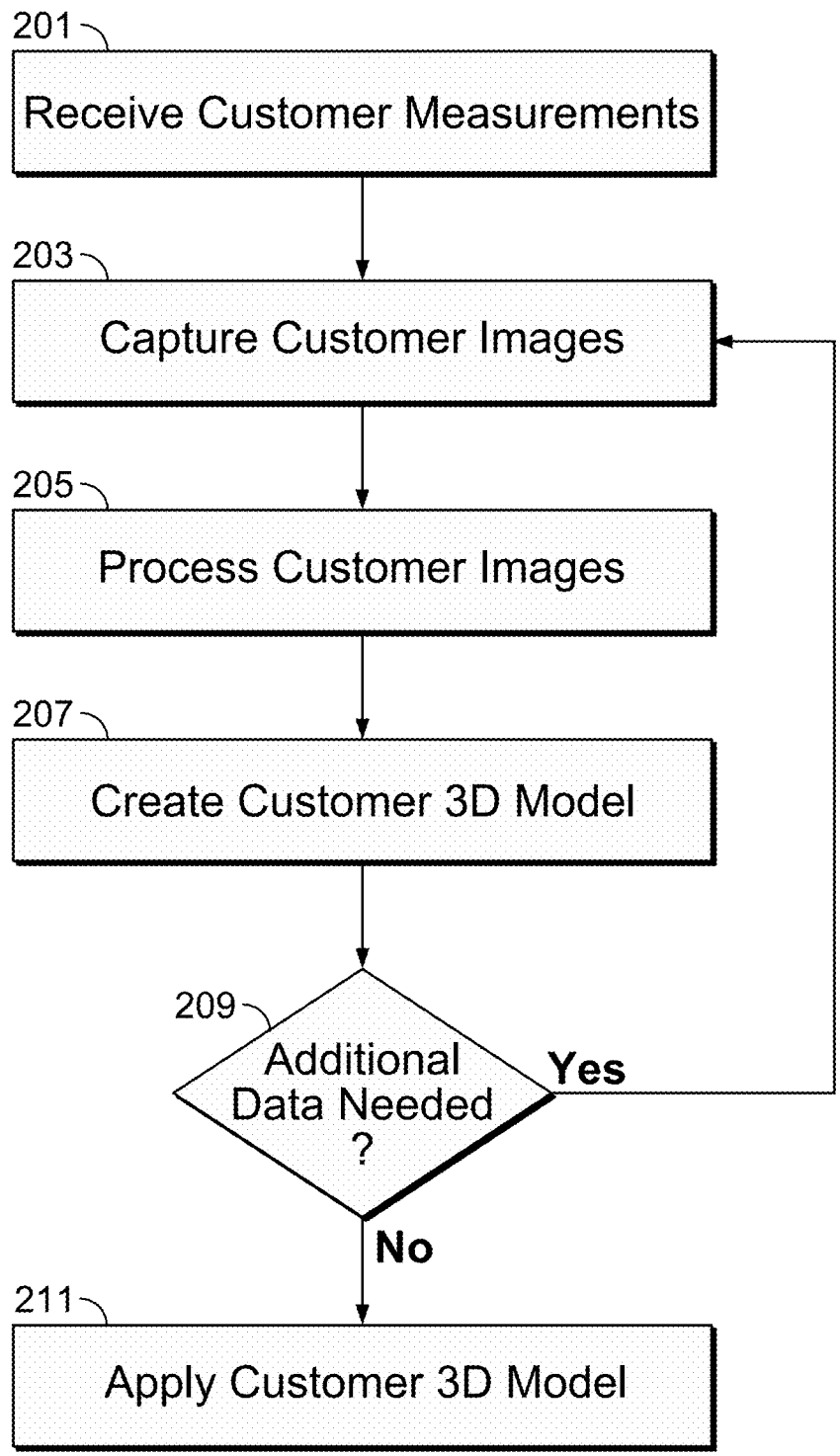
FIG. 2 is a flow chart illustrating an embodiment of a process for creating a custom three-dimensional model of a customer.

FIG. 2 is a flow chart illustrating an embodiment of a process for creating a custom three-dimensional model of a customer. Using the process of FIG. 2, customer data is collected for generating a custom three-dimensional model of a customer. In some embodiments, the data is collected from a mobile device such as a smartphone device, a tablet, a kiosk, a laptop, a smart television, and/or another similar device. The model may be created using the device for collecting the customer data and/or a remote server. In some embodiments, the steps of 201, 203, and/or 205 are performed at 101 of FIG. 1, the steps of 207 and/or 209 are performed at 103 of FIG. 1, and/or the step of 211 is performed at 105 of FIG. 1.

At 201, customer measurements are received. For example, traditional measurement sizes such as shirt size, shoe size, inseam, waist, dress size, etc. may be received. Additional customer measurements may include measurements such as age, weight, fitness level, amount of muscle, etc. In various embodiments, the received customer measurements are used to help seed or augment the three-dimensional model of the customer. In some embodiments, the measurements are received via a graphical user interface (GUI) of a smartphone application. The measurements may also be received by analyzing past purchases made by the customer. For example, past garments are used to determine the customer's size measurements. Both well fitting and poor fitting garments can be used to determine and/or approximate the customer's measurements. A poor fitting pair of pants with customer feedback that they are too short can be used to approximate leg length despite not fitting well.

At 203, customer images are captured. Using a camera, images of the user are captured. In some embodiments, a variety of poses are needed to capture enough data of the customer. For example, a customer is instructed to position her or himself in a predefined number of different poses. In some embodiments, the poses are selected to minimize occlusions. For example, the arms are outstretched to prevent the arms from covering the torso. In some embodiments, the user is instructed to spin in a circle to capture different profiles of the user. The images may be captured as individual images or captured as one or more video sequences of images. In various embodiments, the camera captures color images. In some embodiments, the camera is a three-dimensional camera and captures depth information in addition to color information. In some embodiments, a separate depth sensor may be used to capture depth data that is then merged with the camera image data.

In some embodiments, one or more predefined movements corresponding to different poses are captured. A predefined movement may include poses, one or more dance moves, a simulated runway walk, a curtsy, etc. The movements may be selected from common movements but used to emphasize separation of the limbs from the body, the body from the background, and/or the identification of joints.

At 205, customer images are processed. In various embodiments, the customer images are processed to prepare the image data for creating a three-dimensional model. For example, individual images may be extracted from a video. In various embodiments, certain frames are cut and discarded, such as early frames and/or late frames in the video or image sequence. For example, early and/or late frames may correspond to the customer preparing for a pose. In various embodiments, the images corresponding to required poses are determined and selected. The images may be processed to remove noise, improve white balance, adjust for color contrast, etc. In some embodiments, multiple images are stitched together. In some embodiments, the images are compressed. For example, in some embodiments, the customer images are transmitted to a remote server for processing and may be compressed prior to transmittal.

In some embodiments, the images are calibrated and/or annotated with metadata. For example, the images can be calibrated using camera and/or sensor data such as lens data and gyroscope data. The zoom setting and/or orientation of the camera may be included with the image to help orient the image with respect to the customer and/or with respect to other images in the sequence. In some embodiments, a common origin, such as a three-dimensional origin, is determined for each selected image and used to orient each image. In some scenarios, a close up image of a portion of the body may be difficult to place relative to other images without origin data.

At 207, a three-dimensional human model of the customer is created. Using the images processed at 205, a three-dimensional human model approximating the customer's body shape is created. In some embodiments, the selected images may be segmented to identify the portion of the user from the image and a silhouette of the user portion is created. A model of the user is created by comparing silhouettes of the model to silhouettes extracted from the images. The model may be iteratively modified until there is a match in silhouettes. In various embodiments, joint locations are identified from user portions of the images and matched to joint locations in the model to improve the match.

In some embodiments, the three-dimensional human model is created using a machine learning model. Using images of the user as input, a trained machine learning model is used to infer the model parameters needed to modify a predetermined three-dimensional human model to fit the customer's body shape. The generated model can be compared for accuracy by comparing silhouettes of the model to silhouettes of the user portion of the image.

At 209, a determination is made whether additional data is needed. In the event no additional data is needed, processing continues to 211. In the event additional data is needed, processing continues back to 203.

In some embodiments, the accuracy of the generated model is determined by comparing silhouettes of the generated model to silhouettes of the user portion of the image. A determination is made whether the accuracy of the model is sufficient to accurately represent the customer's body shape. For example, an accuracy percentage is determined for the created model. A determination is made whether the accuracy percentage meets a threshold value. In the event the accuracy percentage meets the threshold value, no additional data is needed. In the event the accuracy percentage does not meet the threshold value, additional data is needed to refine the model. In some embodiments, an accuracy percentage is determined based on and associated with specific portions of the body shape. For example, a torso may be sufficiently accurate but the left foot may not be sufficiently accurate and may require additional data. As another example, the lower body may be sufficiently accurate but the areas around the neck may not be sufficiently accurate and may require additional data.

In some embodiments, the determination whether additional data is needed is based on input of the user. For example, the user is presented with a rendered model compared to the images of the user. In the event the user determines the accuracy is insufficient, additional data is needed and processing proceeds to 203. In the event the user is satisfied with the accuracy of the generated model, no additional data is needed and processing proceeds to 211.

At 211, the created three-dimensional model of the customer is applied to one or more applications. In various embodiments, the applications are applied as described with respect to 105 of FIG. 1. For example, the created model can be used to determine a client vector of parameters that represent the customer's body shape. Different purchasing and/or matching results can be based on the client vector and/or clustering the customer's client vector with other customers.

Figure 3:
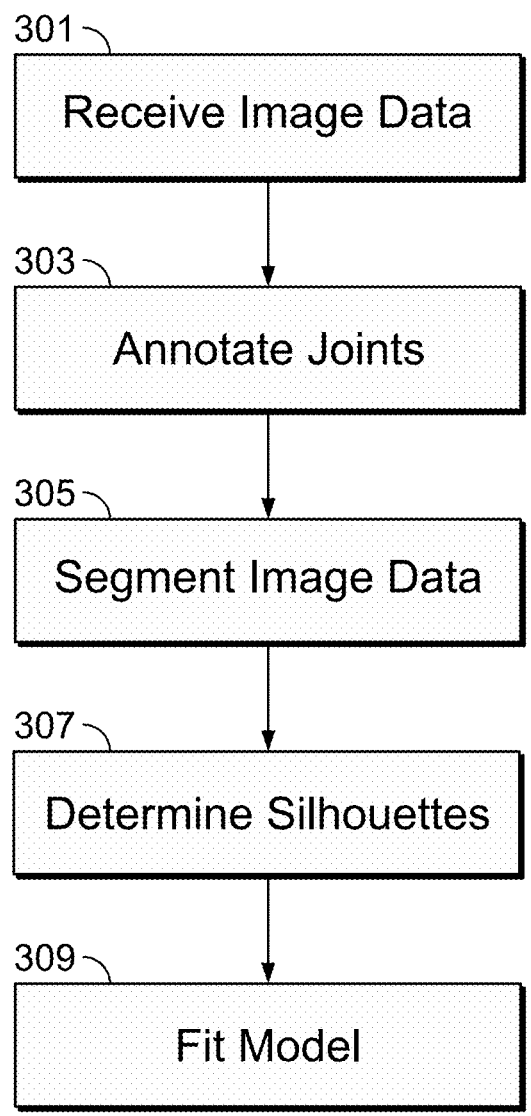
FIG. 3 is a flow chart illustrating an embodiment of a process for creating a custom three-dimensional model.

FIG. 3 is a flow chart illustrating an embodiment of a process for creating a custom three-dimensional model. Using the process of FIG. 3, a custom three-dimensional model of a customer is created from image data. In some embodiments, the process of FIG. 3 is performed at 103 of FIG. 1 and/or at 207 of FIG. 2. In various embodiments, the process may be performed on a device used to capture images of the user and/or a remote server.

At 301, image data is received. In various embodiments, the image data received corresponds to required poses necessary to model a user's body shape. The image data may include metadata such as lens data and orientation data. In some embodiments, the data includes a three-dimensional origin used to calibrate and orient each image with respect to others in the sequence. In some embodiments, the images received have been processed at 205 of FIG. 2.

At 303, joints in the image data are annotated. Using the image data received at 301, the joints are annotated in the image. In various embodiments, the joints are identified by selecting particular poses for the images and/or isolating the movement at joints between images. In some embodiments, the joints are identified in part by utilizing the color and/or depth channels of the images. In various embodiments, a trained machine learning model is used to identify joints using the image data as input. In some embodiments, the joints are annotated by a human. In some embodiments, the joints in the image data are assigned a two-dimensional location. The two-dimensional location may be extrapolated to a three-dimensional location with additional image data, such as image data showing the joints from different profiles.

At 305, the image data is segmented. In some embodiments, the image data is segmented to separate the foreground from the background. The foreground can be identified using depth information and/or using color channels. In some embodiments, an image of the background without the user is utilized to help identify the background from the foreground. In various embodiments, a trained machine learning model is used to segment the foreground and background. In some embodiments, the image data is segmented in parallel with joint annotations.

At 307, silhouettes are determined from the foreground data. In some embodiments, the segmented foregrounds are used to determine corresponding silhouettes. For example, each segmented foreground is converted to a silhouette. In various embodiments, a threshold value is used to convert the foreground into a black and white silhouette. For example, values that exceed the threshold value are included in the silhouette and are colored white. Values that do not exceed the threshold value are not included in the silhouette and are colored black.

At 309, a three-dimensional model is fit to the image data. Using the annotated joint and silhouette data, a predetermined three-dimensional human model is modified to fit the joint and silhouette data. In various embodiments, the fit model represents the body shape of the user captured in the image data.

Figure 4:
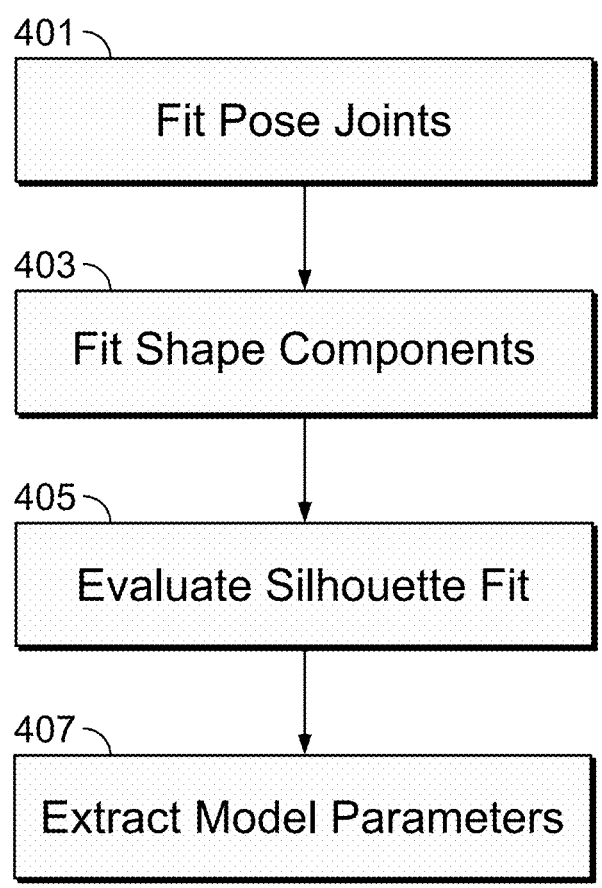
FIG. 4 is a flow chart illustrating an embodiment of a process for fitting a three-dimensional model to a body shape.

FIG. 4 is a flow chart illustrating an embodiment of a process for fitting a three-dimensional model to a body shape. Using joint and silhouette data from captured images, a predetermined three-dimensional human model is modified until it matches the body shape of a user. In some embodiments, the model is modified by using joints as structural reference points and using silhouettes of the model to refine the model's body composition. The joints and their relative positions help to define the overall structure of the model. The model may be modified by modifying one of a set of parameters that adjust the predetermined model. The parameters expand or contract the predetermined model, increasing or decreasing the effective body mass of the model in different areas. In some embodiments, one of a group of predetermined three-dimensional human models is used as a starting model. For example, a predetermined three-dimensional human model may be used for each sex. As another example, a different predetermined three-dimensional human model may be used for children. In some embodiments, the process of FIG. 4 is performed at 103 of FIG. 1, at 207 of FIG. 2, and/or at 309 of FIG. 3. In various embodiments, the process may be performed on a device used to capture images of the user and/or a remote server.

At 401, joints of the model are fit to poses. In the some embodiments, a predetermined three-dimensional human model includes multiple joints, such as joints for the shoulders, elbows, wrists, hands, fingers, hips, knees, ankles, feet, toes, neck, spine, head, etc. The three-dimensional location of the joints in the model can be modified to change the overall structure of the model. For example, the legs of a model can be made longer by increasing the distance between the hip and knee joints as well as increasing the distance between the knee and ankle joints. As another example, a model can be made wider by increasing the distance between the hip joints. The torso can be made narrower by decreasing the distance between shoulder joints. In various embodiments, the joints of the model are fit to the joint information annotated from different pose images. In some embodiments, the three-dimensional locations of joints of the model are fit based on two-dimensional joint locations annotated from different pose images. Using multiple poses allows for more precise fitting and a closer approximation of the user's relative joint positioning. In some embodiments, the joint information is created at 303 of FIG. 3.

Once the joints of the model match the joints of the image poses, the model has a skeletal shape similar to the user. Although the joint locations may match, the body mass of the model may not match the user's body mass. For example, a heavier user and a lighter user can both share the same or similar joint locations. In some scenarios, the user's body composition changes over time. A user that has gained or lost weight still retains the same relative joint locations but has a different body shape at each weight. As another example, users with the same or similar joint locations can carry their mass in different locations, such as in the chest, upper body, midsection, and/or lower body, etc. Matching the joint locations achieves an initial fitting but the model may require additional refinement to match the user's current body composition. In some embodiments, as part of fitting joints to the model, one or more facial feature locations are identified as well. The facial feature locations may include eye, mouth, nose, and/or ear locations, among others.

In some embodiments, the joints of the model are fit by supplying the image poses to a trained machine learning model and predicting the joint locations. The trained machine learning model may be trained using image data and annotated joints, such as annotated joint data from a process similar to that of step 303 of FIG. 3. In some embodiments, the joint locations are predicted in the event there is limited capture data of the user.

At 403, the model is fit to shape components. Using image silhouette data, the model is modified to adjust the silhouette of the model to fit each image silhouette. In some embodiments, the model is manipulated to match the pose of the user in each image and silhouettes of the model are rendered. Body areas corresponding to locations where the silhouette of the model does not extend to cover an image silhouette are expanded to match the image silhouette. Similarly, body areas corresponding to locations where the silhouette of the model extends past the image silhouette are contracted to match the image silhouette. In various embodiments, different image silhouettes are used to refine the body shape of the model. For example, face-on poses typically provide too little information about the shape of the user's chest and front-facing midsection. Additional silhouette data from the side profile of the user may be required to accurately model the user's chest and midsection. In various embodiments, each image silhouette places additional constraints on the body shape of the model and helps to refine the accuracy of the model. In some embodiments, silhouette information is created at 307 of FIG. 3. In various embodiments, the steps of 401 for fitting pose joints and 403 for fitting shape components may be performed in parallel, iteratively, or sequentially (as shown). For example, if performed iteratively, processing may alternative between each of steps 401 and 403. In some embodiments, the steps are performed sequentially and step 401 is performed before step 403 (as shown) or, alternatively, step 403 is performed before step 401 (not shown).

In some embodiments, a fixed number of feature parameters are needed to adjust the model to fit a large range of body shapes. The body shape parameters are selected to efficiently model the expected range of users with minimal functional overlap. In some scenarios, as few as ten feature parameters are needed. Example feature parameters may loosely correspond to a user's height, width, leg length, width at hips, etc. As additional customers with different body shapes are added, new feature parameters can be introduced to provide better coverage of diverse body shapes. For example, feature parameters may correspond to the user's upper body muscularity, lower body muscularity, body mass index, etc. In some embodiments, feature parameters correspond to different large muscle groups such as the back, shoulder, arm, leg, and/or trunk muscles, among others. In some embodiments, feature parameters include one or more parameters for accurately modeling the user's chest.

In some embodiments, the body shape of the model is adjusted in an iterative process. For example, the model may be modified and silhouettes compared. Based on the accuracy of the match, the model may be further modified again. An accuracy percentage may be determined for each created model. The iterative process may continue until an accuracy percentage meets a threshold value, a maximum number of iterations is performed, or another appropriate limitation is reached.

In some embodiments, body shape components are fit using a machine learning model by supplying the image silhouettes to a trained machine learning model and predicting the body shape feature parameters. The trained machine learning model may be trained using silhouette data and corresponding body feature parameters. In some embodiments, the silhouette data is derived using portions of the process of FIG. 3. In some embodiments, the body shape components are fit by a human, such as the user, using a graphical user interface.

In some embodiments, the predetermined three-dimensional human model is a spectral decomposition model. Using spectral decomposition approach, a modification to a single vertex impacts more than the single vertex but also surrounding vertices and regions. Similar to a human body, pulling on a single point of the surface of the body impacts all the surrounding skin. Using a spectral decomposition model, silhouette modifications can more quickly converge on a match and help the model retain the shape of a human body. A modification to one vertex of the model impacts the entire region of the vertex in the same direction as the vertex modification. Regions of the model are modified by adjusting only a limited number of vertices that can be identified by comparing silhouettes.

At 405, the silhouette fit for the created model is evaluated. Once joint and shape components have been fit at 403, the generated three-dimensional human model should closely approximate the customer's body shape. To determine the accuracy of the model, a silhouette fit for the created model is evaluated. For example, similar to the process at 403, silhouettes of the generated model are rendered and compared to the image silhouettes. An accuracy percentage may be determined for the created model and additional data may be required. In some embodiments, particular body regions are identified as needing more data. For example, more detail may be needed of the feet, the crotch area, around the neck, etc. In the event additional data is required, the user may be prompted to capture more data (not shown). In some embodiments, the user is presented with the created model and the user evaluates whether the model accurately reflects the user's body shape. In some embodiments, the step of 405 is optional.

At 407, model parameters are extracted. Using the created three-dimensional human model, model parameters are extracted to create a client vector. The model parameters may include the feature parameters for generating the model. In some embodiments, the model parameters also include the joint locations. The extracted client vector is a set of parameters that accurately represents the user's body shape.

In some embodiments, the client vector is used to generate a set of client measurements for use in clothing sizing. For example, the client vector and/or model can be used to predict for the user the measurements that a tailor would have taken by measuring the actual body of the user. Instead, a virtual tape measure can be applied to the generated model to predict the same measurements. In some embodiments, the client vector is used to generate the point of measurements for the user.

Figure 5:
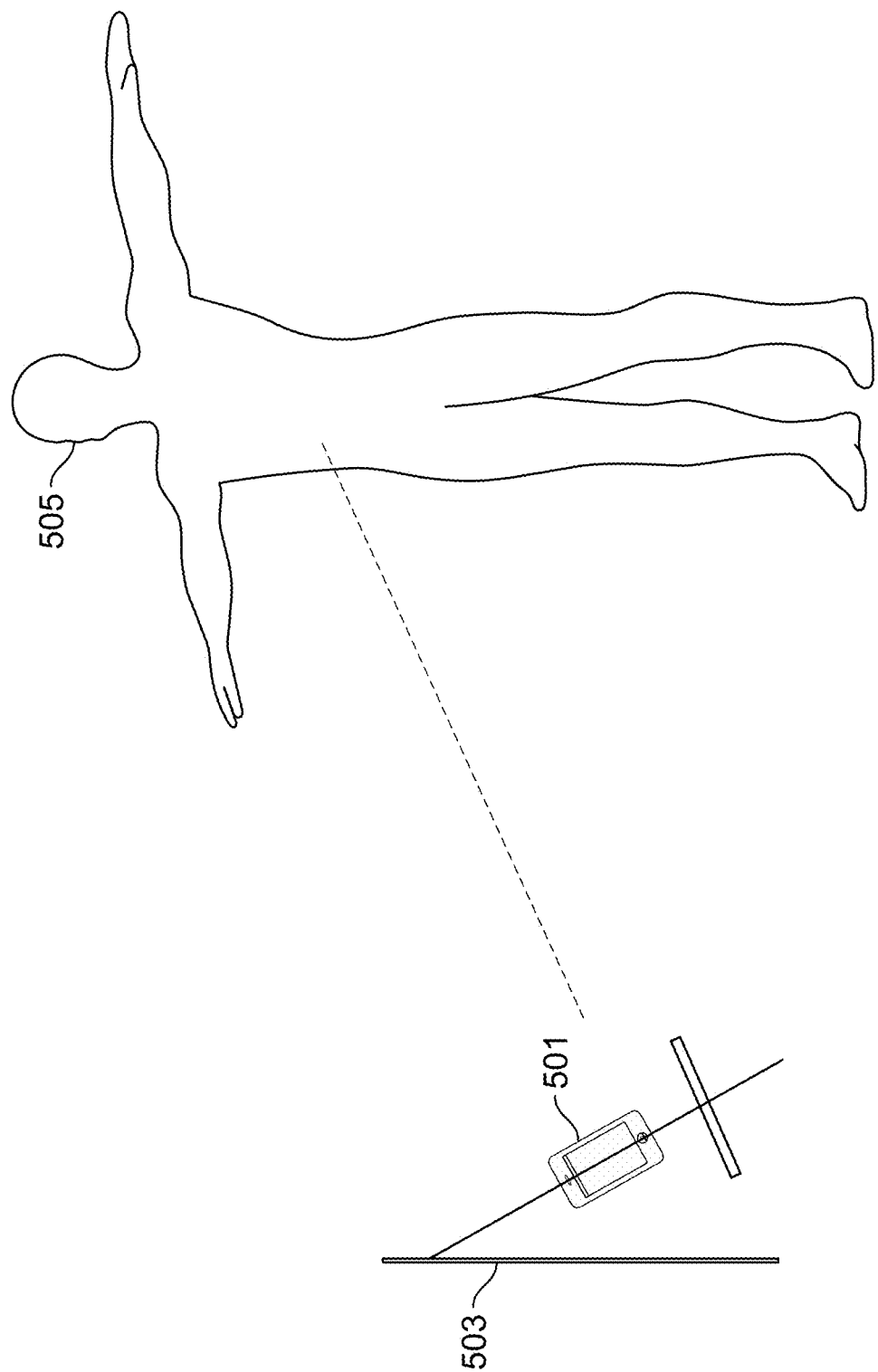
FIG. 5 is a diagram illustrating an example configuration for capturing images of a customer's body shape.

FIG. 5 is a diagram illustrating an example configuration for capturing images of a customer's body shape. In various embodiments, the configuration is utilized in the event a tripod or another capture setup is not utilized. Device 501 is placed against wall 503 at a configured angle, such as 30 degrees. Device 501 includes a camera and is used to capture images of user 505. In the example shown, user 505 is depicted by a representation of the user at the location the human user should stand. The camera of device 501 is oriented to face user 505 (not shown). Device 501 is set up to capture different images of user 505 including images of different poses and/or profiles. In various embodiments, an application on device 501 provides instructions, such as voice instructions, to user 505 to assist in the setup and capture of image data. For example, the instructions may include where and how to stand (e.g., move closer, move farther, move to the left, move to the right, turn left, turn right, lift arms, etc.). The instructions may explain what poses to make, when to start a pose, when a pose is complete, etc. In some embodiments, the instructions may be based on image data captured in real time by device 501, such as the distance user 505 is from device 501. In some embodiments, device 501 is computer system 1500 of FIG. 15. In some embodiments, the images are captured as part of step 101 of FIG. 1 and/or 203 of FIG. 2.

Figure 6:
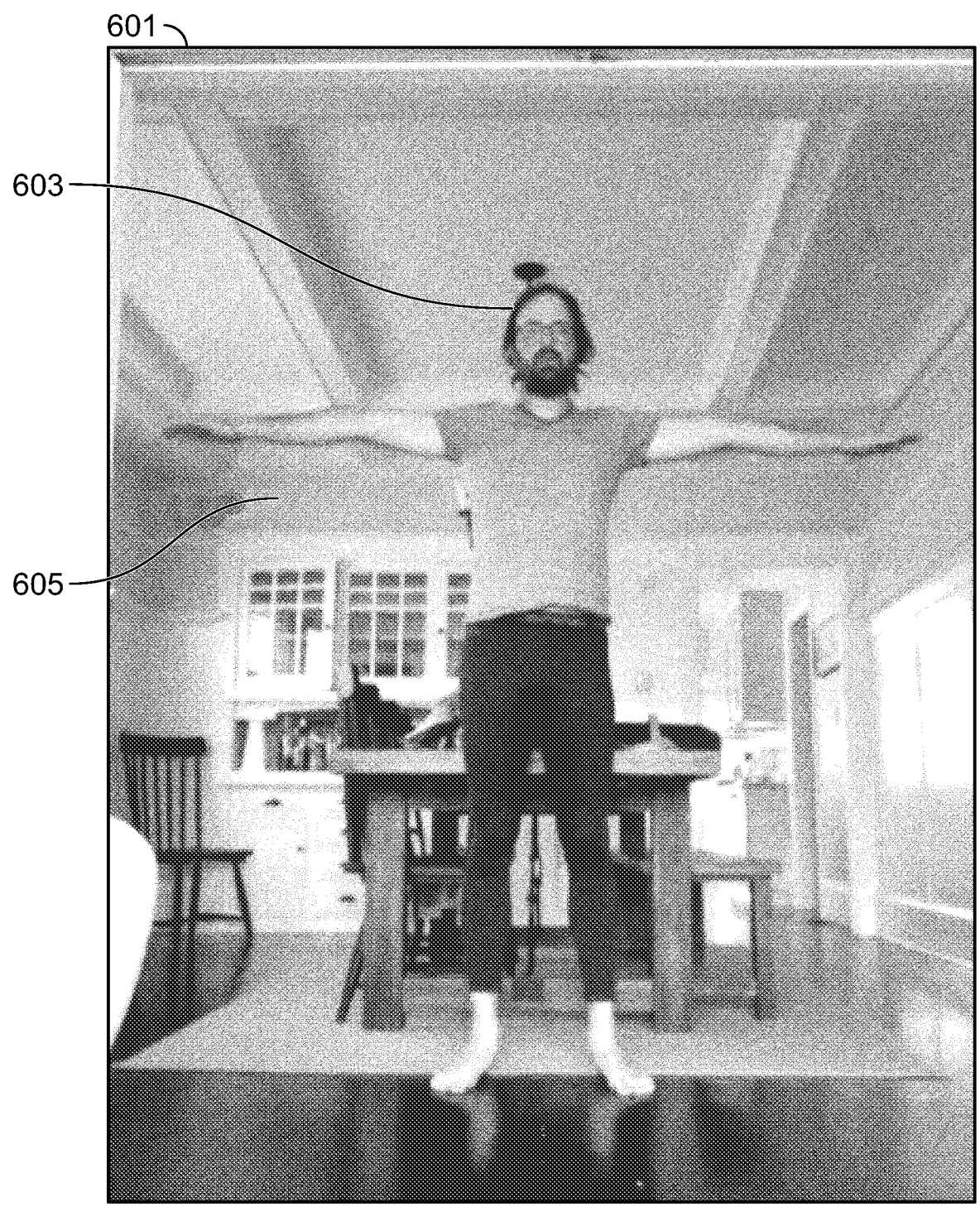
FIG. 6 is a diagram illustrating an example image captured for creating a custom three-dimensional model of a customer.

FIG. 6 is a diagram illustrating an example image captured for creating a custom three-dimensional model of a customer. Image data 601 includes user 603 and background 605. User 603 is in the foreground of image data 601. In some embodiments, the pose of user 603 is determined to increase the accuracy of the data used for generating a custom three-dimensional model. In the example shown, user 603 has his arms stretched out and raised to his sides to maximize the visible body area and to prevent occlusions, such as covering hip joint locations. In some embodiments, image data 601 is captured as part of step 101 of FIG. 1 and/or step 203 of FIG. 2. In some embodiments, image data 601 is processed at 205 of FIG. 2 and/or received at 301 of FIG. 3 as part of a series of image data of a customer. In some embodiments, image data 601 is extracted from captured video data. In some embodiments, image data 601 is captured using the configuration of FIG. 5.

Figure 7:
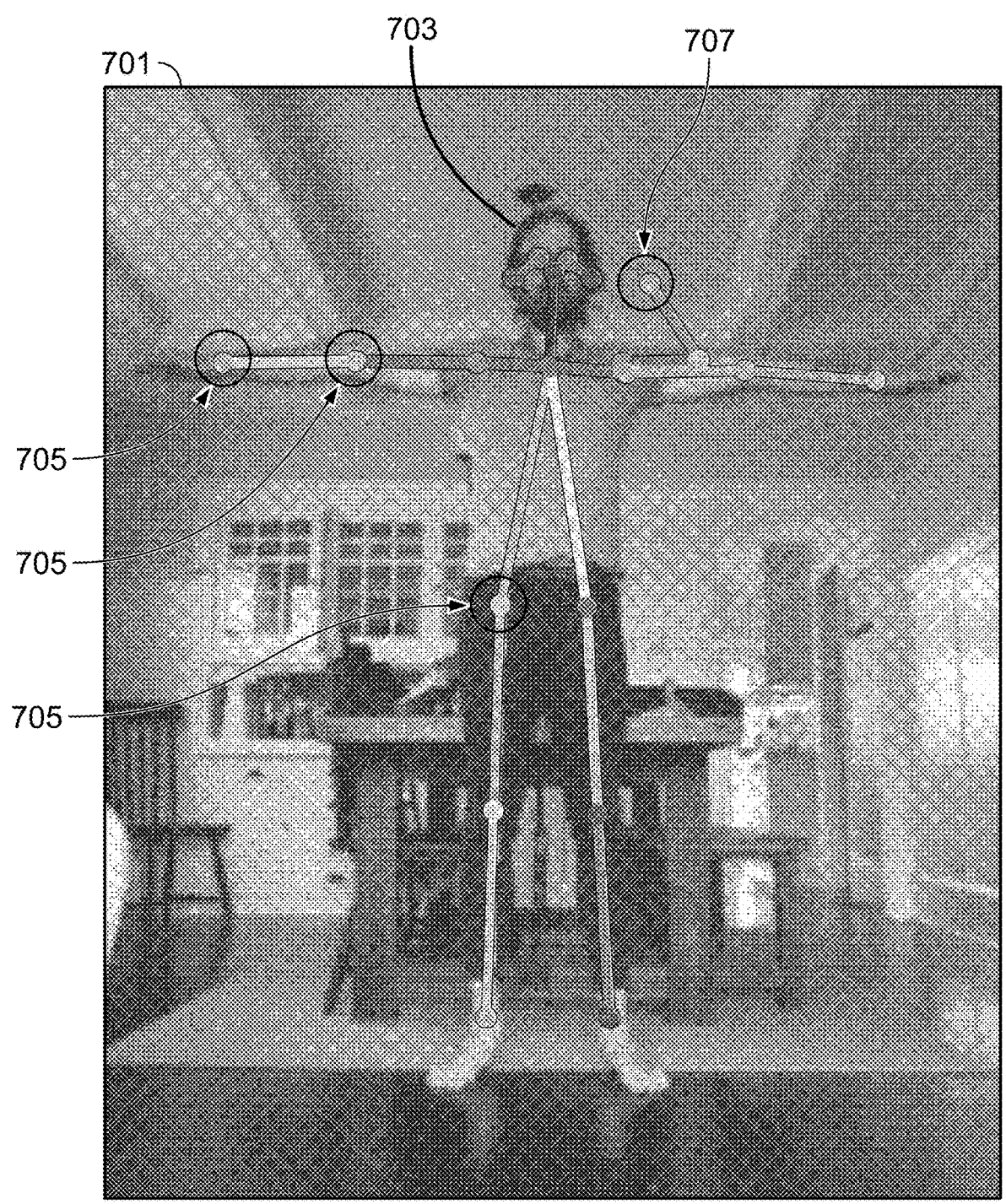
FIG. 7 is a diagram illustrating an example image annotated with joint data for creating a custom three-dimensional model of a customer.

FIG. 7 is a diagram illustrating an example image annotated with joint data for creating a custom three-dimensional model of a customer. Image data 701 includes user 703 with specific joints annotated. Identified joints, including joints 705 and 707, are depicted as filled circles. The lines connecting the joints represent a structural skeleton of user 703. In the example shown, joints 705 are circled and point to wrist, elbow, and hip joints. Joint 707 is circled and is a misidentified joint positioned above the shoulder of user 703. In various embodiments, as more image data with corresponding additional constraints is annotated, the accuracy of the joint data and annotation improves. In some embodiments, joint data is annotated at 303 of FIG. 3. In some embodiments, image data 701 is a processed version of image data 601 of FIG. 6.

Figure 8:
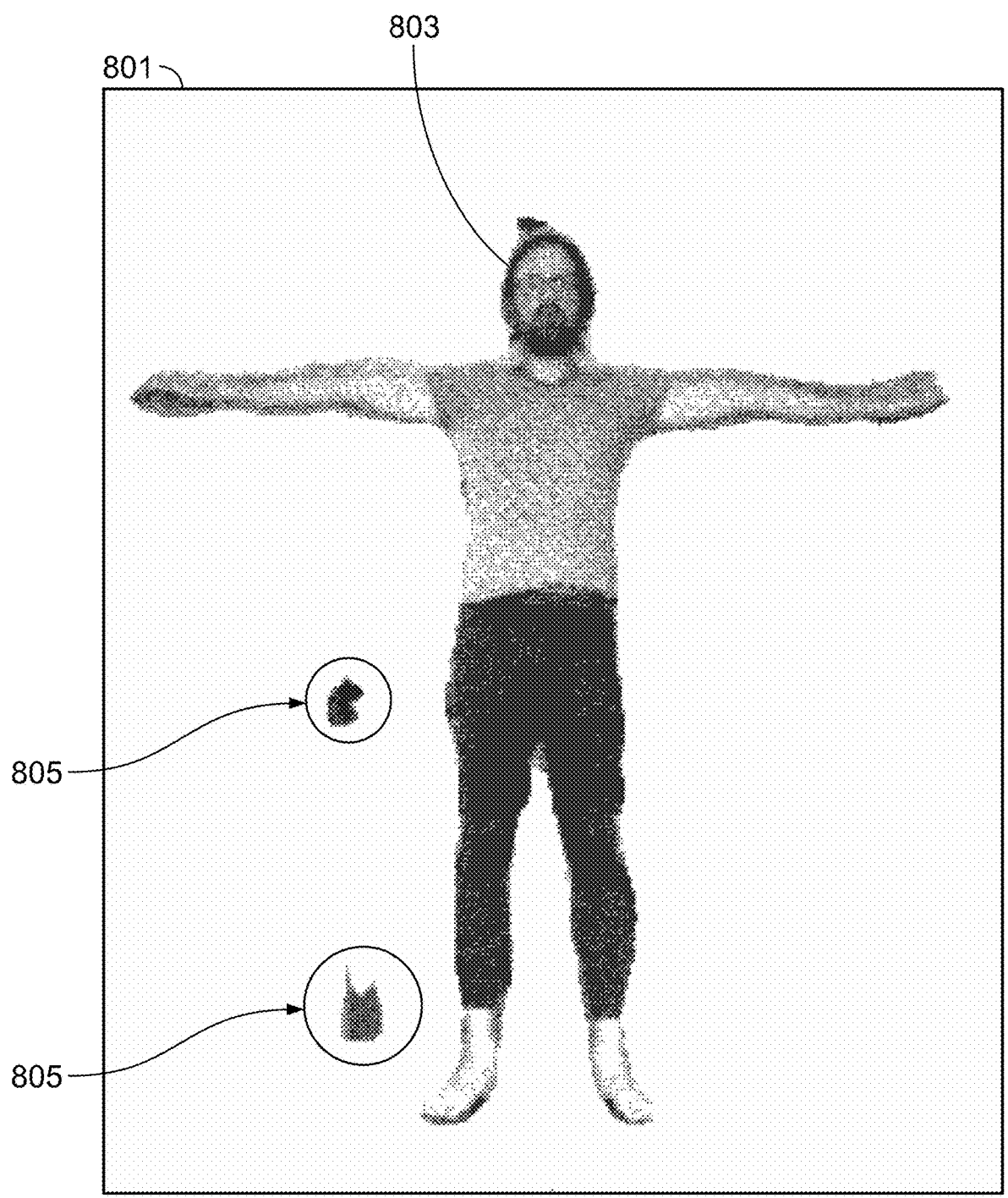
FIG. 8 is a diagram illustrating an example of a segmented image used for creating a custom three-dimensional model of a customer.

FIG. 8 is a diagram illustrating an example of a segmented image used for creating a custom three-dimensional model of a customer. Image data 801 includes user 803 and has had the background removed via segmentation. User 803 is the foreground portion of an image and corresponds to the user portion of the image. In various embodiments, as more image data is captured, the accuracy of the segmentation improves. In the example shown, artifacts 805 are circled and point to two portions of the image incorrectly identified as foreground portions. Similarly, areas around the head, areas outlining the arms, and areas between the legs near the crotch of user 803 include portions of the background that have been incorrectly included in the foreground. In some embodiments, depth information is used to improve the segmentation process to more accurately remove these background portions such as artifacts 805. In some embodiments, image data is segmented at 305 of FIG. 3. In some embodiments, image data 801 is a processed version of image data 601 of FIG. 6.

Figure 9:
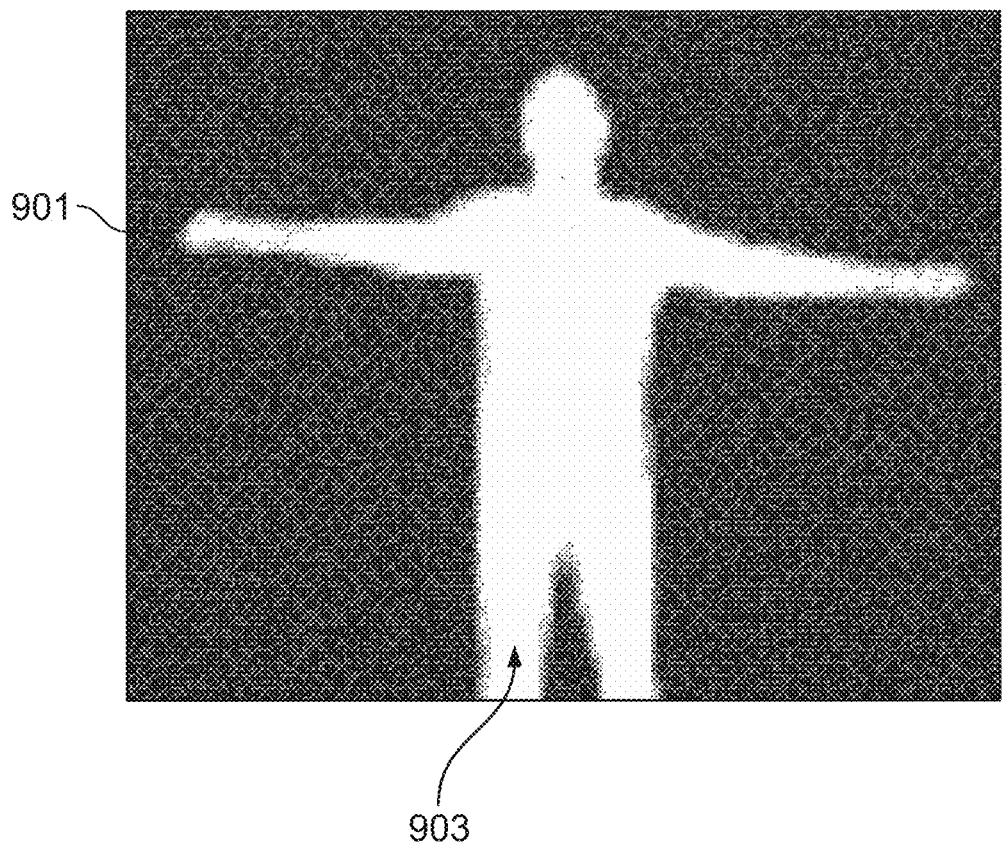
FIG. 9 is a diagram illustrating an example of a silhouette image used for creating a custom three-dimensional model of a customer.

FIG. 9 is a diagram illustrating an example of a silhouette image used for creating a custom three-dimensional model of a customer. Silhouette image 901 includes the user silhouette 903 that corresponds to the silhouette of the customer. In the example shown, user silhouette 903 is colored in white and the rest of silhouette image 901 is black. In some embodiments, silhouette image 901 is image data 801 of FIG. 8 after converting the segmented foreground of user 803 of FIG. 8 into a user silhouette 903. In some embodiments, a silhouette image is determined at 307 of FIG. 3.

Figure 10:
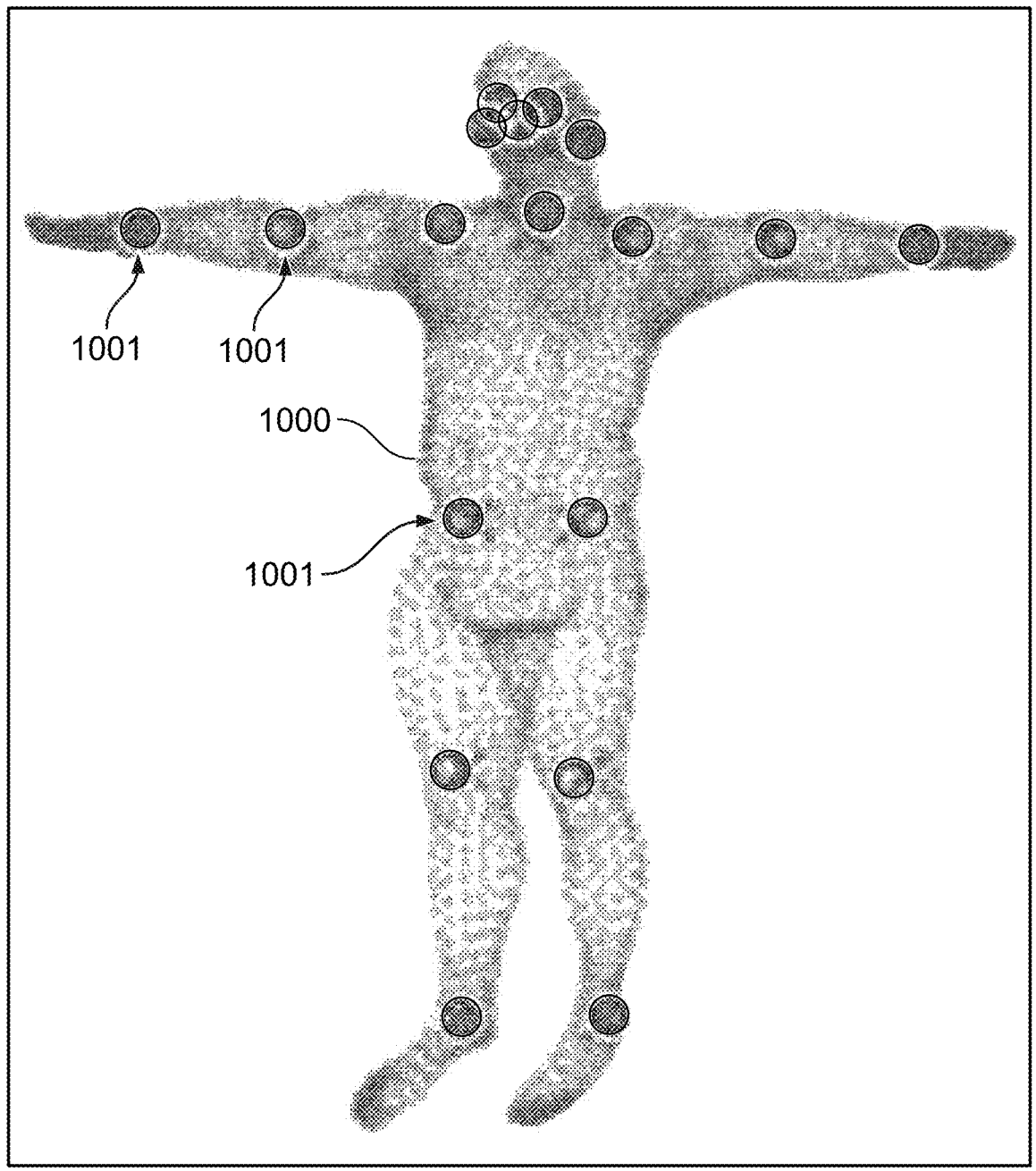
FIG. 10 is a diagram illustrating an embodiment of a three-dimensional human model fit to joint data.

FIG. 10 is a diagram illustrating an embodiment of a three-dimensional human model fit to joint data. In the example shown, model 1000 includes joints, including joints 1001, depicted as circles. Prior to joint fitting, model 1000 was a predetermined three-dimensional human model. In the example shown, the three-dimensional locations of joints of model 1000 are fit based on pose images such as image data 701 with annotated two-dimensional joint location data. The location of the joints including their relative locations to one another have been modified. In some embodiments, joints 1001 point to wrist, elbow, and hip joints and are fit to joints 705 of FIG. 7. By modifying the joint locations, the model more closely approximates the body shape of a user. In some embodiments, the joints of model 1000 are fit at 401 of FIG. 4.

Figure 11A:
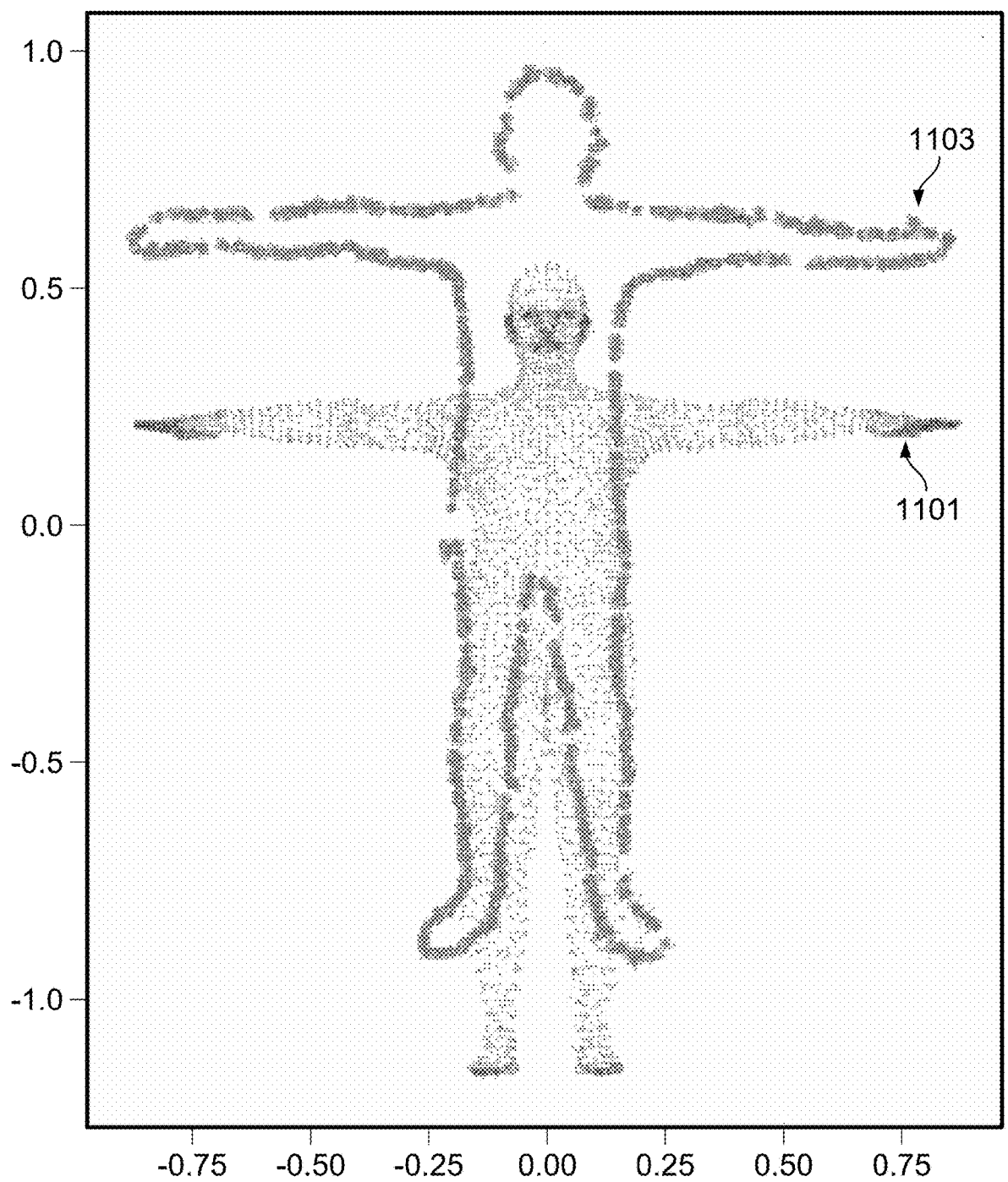
FIG. 11A is a diagram illustrating an embodiment of a three-dimensional human model compared to an image silhouette.

FIG. 11A is a diagram illustrating an embodiment of a three-dimensional human model compared to an image silhouette. The diagram of FIG. 11A represents the process of fitting a three-dimensional model to a two-dimensional silhouette. In the example shown, model 1101 is a three-dimensional human model and image silhouette 1103 is a two-dimensional silhouette converted from image data. In some embodiments, model 1101 is model 1000 of FIG. 10 and silhouette 1103 is extracted from silhouette image 901 of FIG. 9. In various embodiments, the shape components of model 1101 are modified to fit the silhouette of model 1101 to image silhouette 1103. In some embodiments, the process to fit the shape components of the model is performed at 403 of FIG. 4.

Figure 11B:
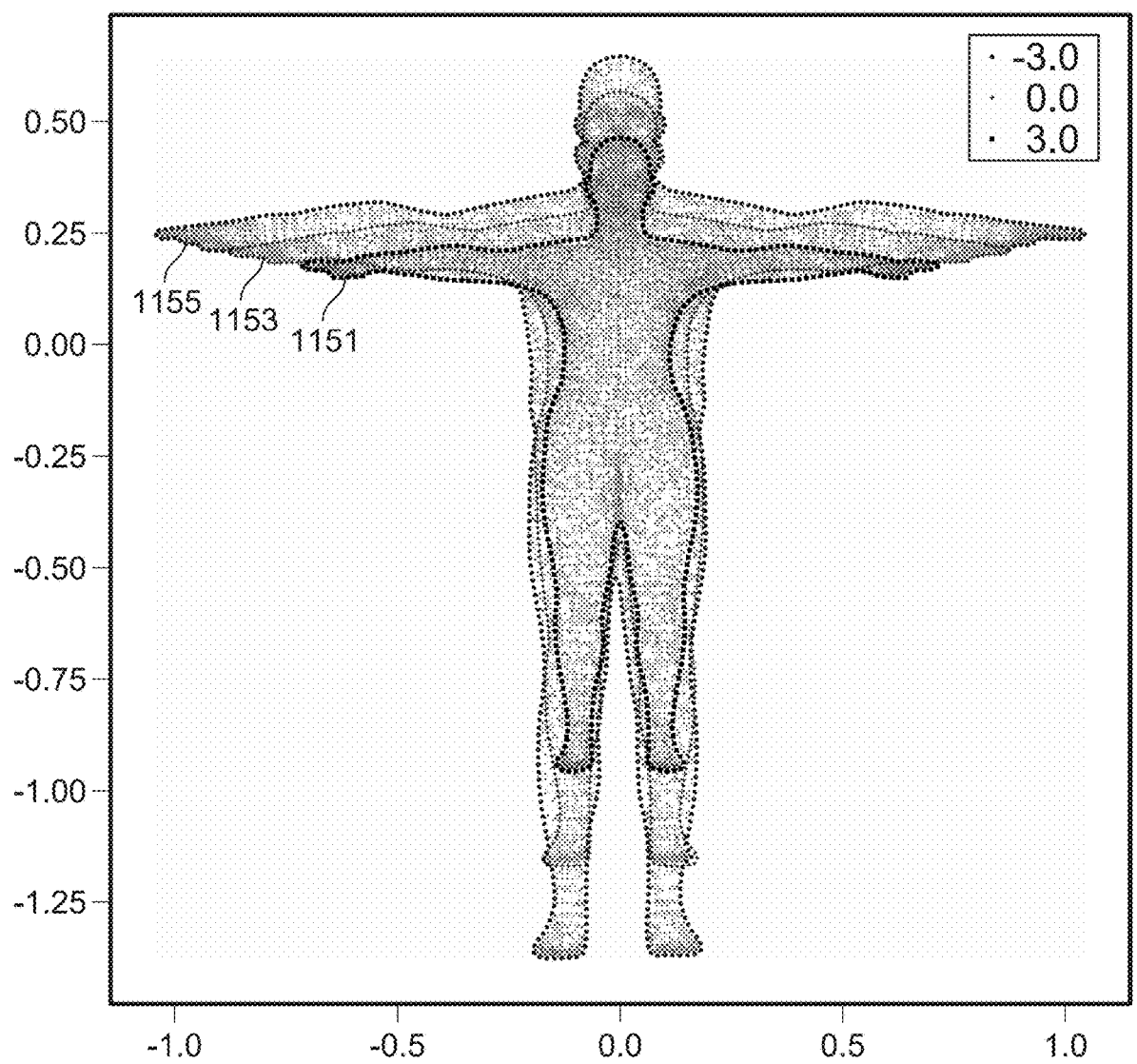
FIG. 11B is a diagram illustrating an embodiment of a process for modifying a three-dimensional human model to fit an image silhouette.

FIG. 11B is a diagram illustrating an embodiment of a process for modifying a three-dimensional human model to fit an image silhouette. In the example shown, model 1151 is a predetermined three-dimensional human model. Model 1151 represents a model with no parameter modifications. In order to create a custom model, model 1151 is modified to match the body shape of a user. In the example shown, model 1153 is a model with a feature parameter corresponding to height adjusted to increase the height of model 1151. Although model 1153 is taller than model 1151, model 1153 is still too short compared to the user. Compared to model 1153, model 1155 is a model with a feature parameter corresponding to height that matches an image silhouette of the user. In some embodiments, the process of fitting a model to an image silhouette is an iterative process illustrated by the sequence of models starting with model 1151, made taller with model 1153, and finishing with model 1155. In various embodiments, the model parameter modified as illustrated in FIG. 11B is only one of the parameters that can be modified to best fit the shape components of a model to the body shape of the user. Moreover, the models of FIG. 11B are only representative models to illustrate the process and the actual iterative process may include many more iterative models and changes to many more shape component parameters. In some embodiments, the process to fit the shape components of the model is performed at 403 of FIG. 4.

Figure 12:
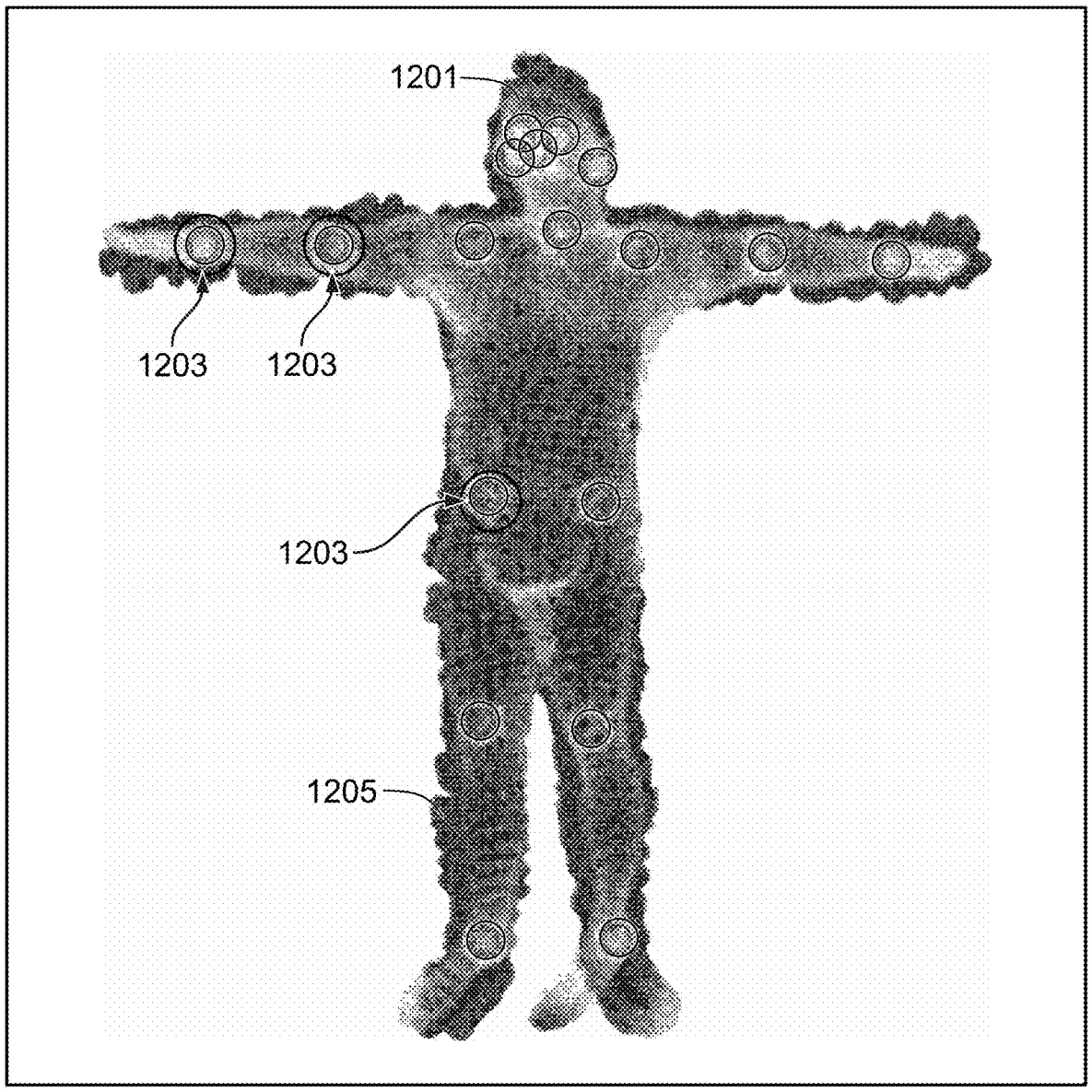
FIG. 12 is a diagram illustrating an embodiment of a process for fitting a three-dimensional human model to a customer body shape.

FIG. 12 is a diagram illustrating an embodiment of a process for fitting a three-dimensional human model to a customer body shape. In the example shown, model 1201 is a custom three-dimensional human model being fit to a customer's body shape. In some embodiments, the process of fitting a model is performed using the process of FIG. 4. Identified joints, including joints 1203, of model 1201 are circled. In the example shown, joints 1203 point to wrist, elbow, and hip joints. In some embodiments, model 1201 corresponds to model 1000 of FIG. 10 and joints 1203 are correspond to joints 1001 of FIG. 10. In some embodiments, the joints of model 1201 are fit at 401 of FIG. 4. In the example shown, the pose of model 1201 is articulated to mimic the pose of silhouette 1205. Silhouette 1205 is generated from a silhouette of the customer such as from user silhouette 903 of silhouette image 901 of FIG. 9. To determine how to modify model 1201 to more closely match the body shape of the customer, the body shape of model 1201 is compared to silhouette 1205. In some embodiments, the process for fitting model 1201 to silhouette 1205 is performed at 405 of FIG. 4. In the example shown, additional fit refinement is needed since silhouette 1205 and model 1201 are not an exact match. In certain areas, silhouette 1205 protrudes from the outline of model 1201.

Figure 13:
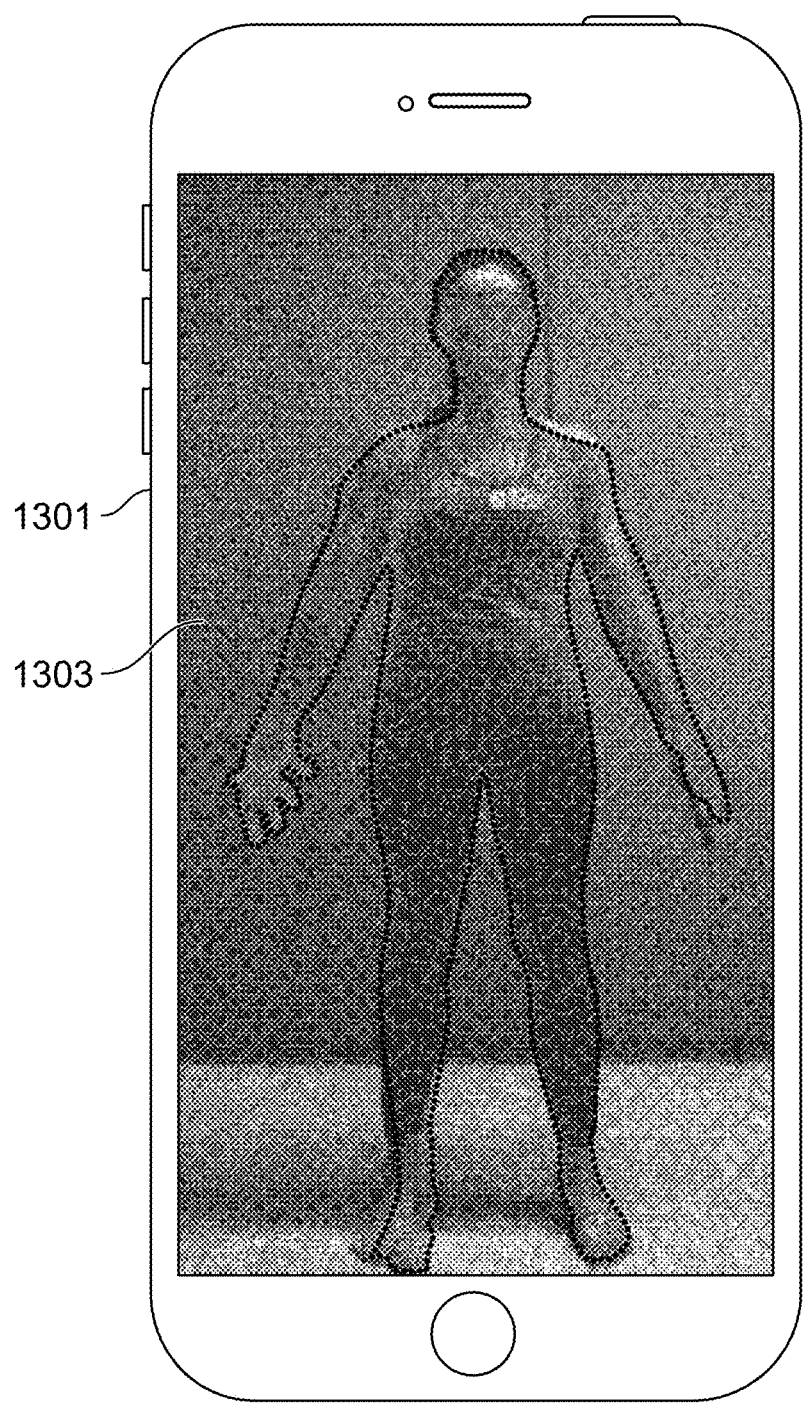
FIG. 13 is a diagram illustrating an embodiment of a graphical user interface (GUI) for creating a three-dimensional human model of a customer.

FIG. 13 is a diagram illustrating an embodiment of a graphical user interface (GUI) for creating a three-dimensional human model of a customer. Using the GUI of FIG. 13, a user can create and/or review a created model of the customer. In some embodiments, the user may also modify the created model to adjust any body portions that require additional refinement. In the example shown, device 1301 displays model rendering 1303. Device 1301 may be a smartphone device, a tablet, or another similar device. Model rendering 1303 includes a rendering of the custom three-dimensional model of the customer (in dots) overlaid on an image captured of the user. By viewing model rendering 1303, a user can visually inspect the accuracy of the model. In some embodiments, the user can accept or reject the created model. In various embodiments, the model rendered in model rendering 1303 is created using one or more of the processes of FIGS. 1-4.

In some embodiments, a user of device 1301 can select portions of model rendering 1303 to identify areas of the model that require additional refinement. For example, a user can select the rendering of the model's right foot to indicate that the modeling of the customer's right foot requires additional refinement. In some embodiments, the user can manipulate the model to refine the accuracy of the model. For example, the user may rotate the model, articulate the model at joint locations, expand or contract portions of the model to add or remove body mass, etc. As another example, the user can lengthen or shorten the model and/or widen or narrow the model. In some embodiments, model rendering 1303 is displayed on a touchscreen display and the user can manipulate the model using touch gestures. In some embodiments, device 1301 is device 501 of FIG. 5 and/or computer system 1500 of FIG. 15. In some embodiments, the interface of FIG. 13 is used at 207, 209, and/or 211 of FIG. 2 as part of the process for creating the custom model for a customer.

Figure 14:
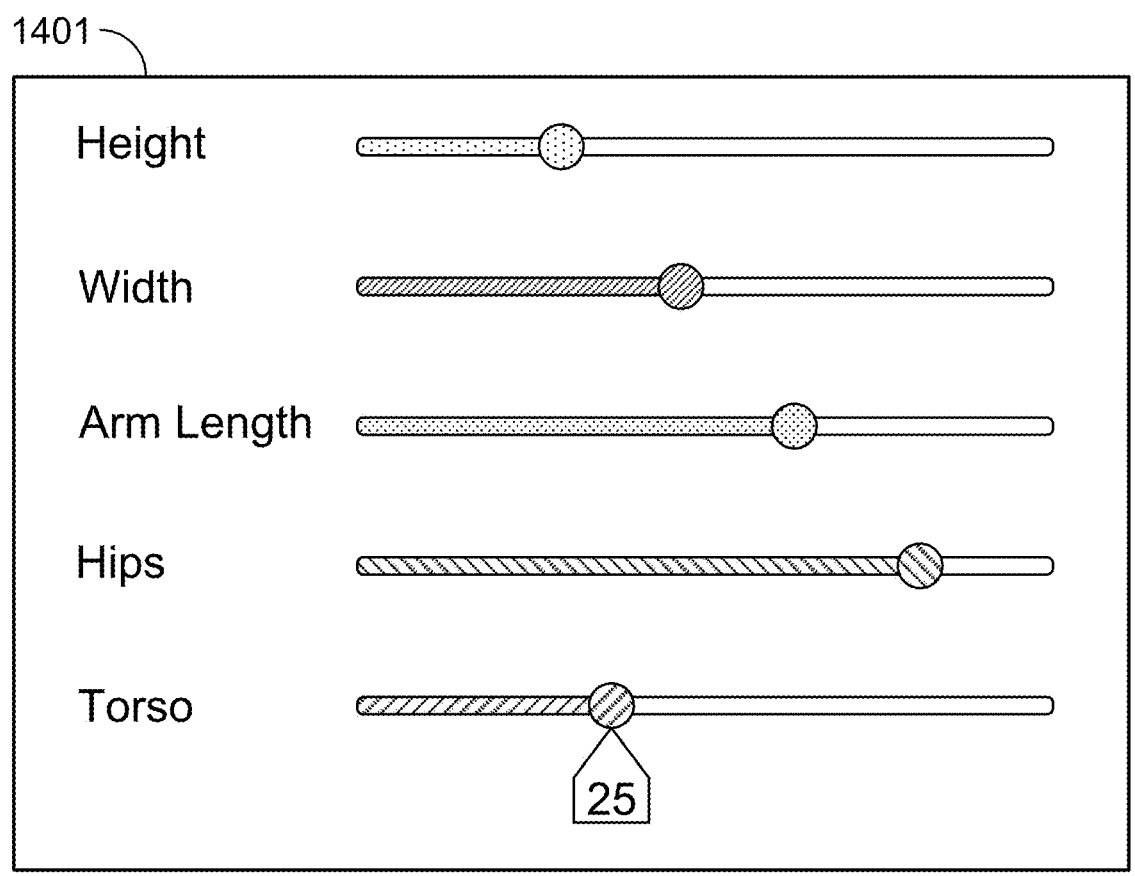
FIG. 14 is a diagram illustrating an embodiment of a graphical user interface (GUI) for modifying body shape parameters of a three-dimensional human model.

FIG. 14 is a diagram illustrating an embodiment of a graphical user interface (GUI) for modifying body shape parameters of a three-dimensional human model. In the example shown, user interface 1401 can be used to adjust multiple feature parameters that modify a model's body shape. User interface 1401 includes parameters: height, width, arm length, hips, and torso that can be adjusted using sliders. The slider for torso displays a numeric value associated with the torso parameter. Although five parameters are shown with slider controls, in various embodiments, additional (or fewer) parameters may be modified using appropriate user interface controls. In some embodiments, as the parameters for the model are modified, a rendering of the model, such as model rendering 1303 of FIG. 13, is displayed in real-time to update the user on the impact of the changes. In some embodiments, the values associated with the feature parameters are a client vector and represent a body profile of a customer. In some embodiments, the user interface of FIG. 14 is used at 103 of FIG. 1 and/or at 207 and/or 209 of FIG. 2 for assisting in the creation of a three-dimensional human model of a customer. In various embodiments, the GUI of FIG. 14 is displayed on a device such as device 501 of FIG. 5 and/or computer system 1500 of FIG. 15.

Figure 15:
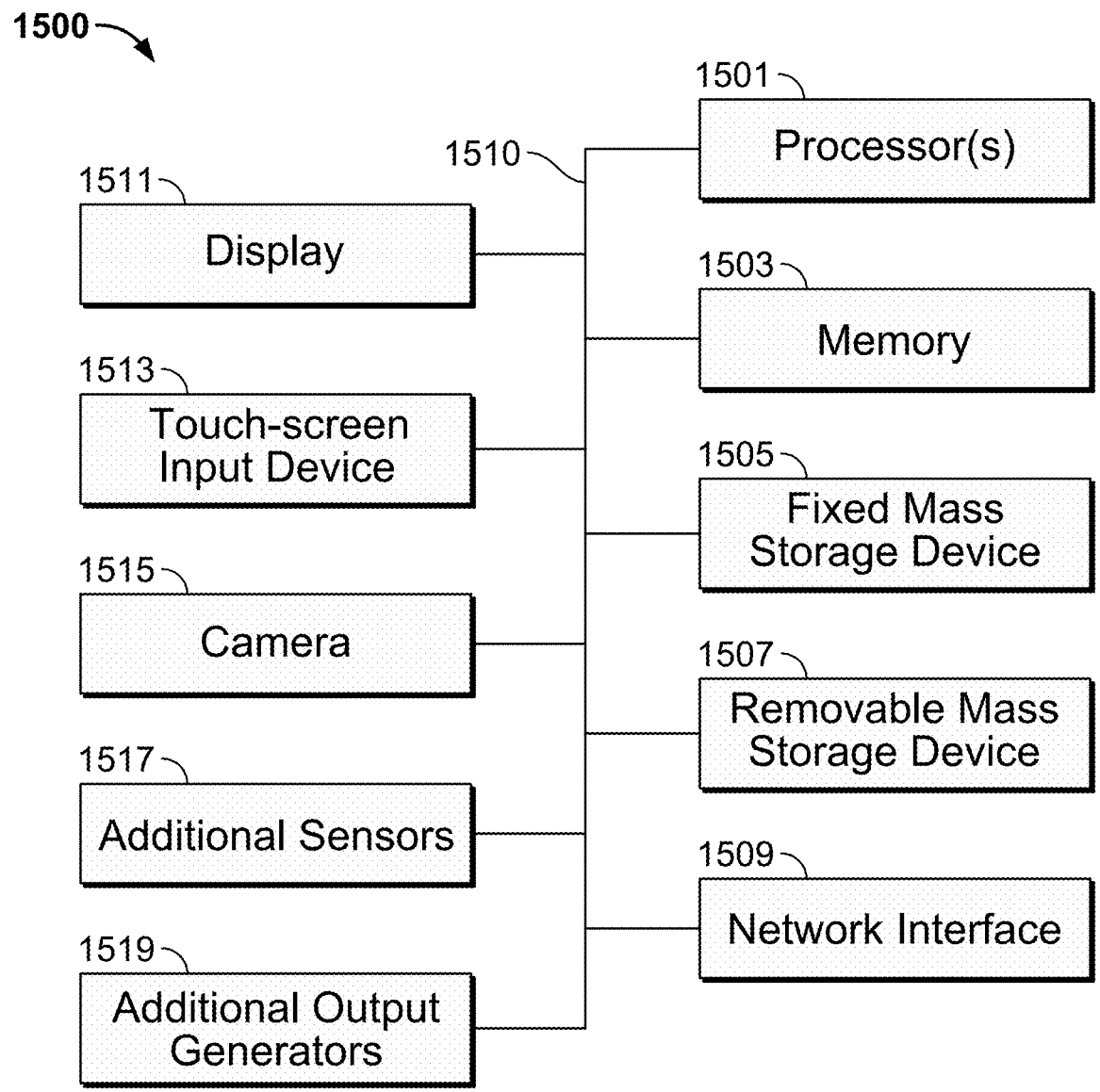
FIG. 15 is a functional diagram illustrating a programmed computer system for creating a custom three-dimensional model of a customer.

FIG. 15 is a functional diagram illustrating a programmed computer system for creating a custom three-dimensional model of a customer. For example, a programmed computer system may be a mobile device, such as a smartphone device, a tablet, a kiosk, a laptop, a smart television, and/or another similar device for capturing images of a user. In some embodiments, a programmed computer system is a desktop or server computer system for processing captured image data and creating a custom three-dimensional model of a customer. As will be apparent, other computer system architectures and configurations can be used. Computer system 1500, which includes various subsystems as described below, includes at least one microprocessor subsystem (also referred to as a processor or a central processing unit (CPU)) 1501. For example, processor 1501 can be implemented by a single-chip processor or by multiple processors. In some embodiments, processor 1501 is a general purpose digital processor that controls the operation of the computer system 1500. Using instructions retrieved from memory 1503, the processor 1501 controls the reception and manipulation of input data, and the output and display of data on output devices (e.g., display 1511). In some embodiments, processor 1501 includes and/or is used to provide functionality for creating custom three-dimensional models of customers. In some embodiments, processor 1501 is used to perform at least part of the processes described with respect to FIGS. 1-4 and illustrated with respect to the diagrams of FIGS. 6-14. In some embodiments, computer system 1500 is device 501 of FIG. 5.

Processor 1501 is coupled bi-directionally with memory 1503, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1501. Also as is well known in the art, primary storage typically includes basic operating instructions, program code, data, and objects used by the processor 1501 to perform its functions (e.g., programmed instructions). For example, memory 1503 can include any suitable computer-readable storage media, described below, depending on whether, for example, data access needs to be bi-directional or uni-directional. For example, processor 1501 can also directly and very rapidly retrieve and store frequently needed data in a cache memory (not shown).

A removable mass storage device 1507 provides additional data storage capacity for the computer system 1500, and is coupled either bi-directionally (read/write) or uni-directionally (read only) to processor 1501. For example, removable mass storage device 1507 can also include computer-readable media such as flash memory, portable mass storage devices, magnetic tape, PC-CARDS, holographic storage devices, and other storage devices. A fixed mass storage 1505 can also, for example, provide additional data storage capacity. Common examples of mass storage 1505 include flash memory, a hard disk drive, and an SSD drive. Mass storages 1505, 1507 generally store additional programming instructions, data, and the like that typically are not in active use by the processor 1501. Mass storages 1505, 1507 may also be used to store user-generated content and digital media for use by computer system 1500. It will be appreciated that the information retained within mass storages 1505 and 1507 can be incorporated, if needed, in standard fashion as part of memory 1503 (e.g., RAM) as virtual memory.

In addition to providing processor 1501 access to storage subsystems, bus 1510 can also be used to provide access to other subsystems and devices. As shown, these can include a network interface 1509, a display 1511, a touch-screen input device 1513, a camera 1515, additional sensors 1517, additional output generators 1519, as well as an auxiliary input/output device interface, a sound card, speakers, additional pointing devices, and other subsystems as needed. For example, an additional pointing device can be a mouse, stylus, track ball, or tablet, and is useful for interacting with a graphical user interface. In the example shown, display 1511 and touch-screen input device 1513 may be utilized for displaying a graphical user interface for capturing images of a customer and/or creating/modifying a custom three-dimensional model of the customer. In some embodiments, camera 1515 and/or additional sensors 1517 include a depth sensor for capturing depth information along with image data.

The network interface 1509 allows processor 1501 to be coupled to another computer, computer network, telecommunications network, or network device using one or more network connections as shown. For example, through the network interface 1509, the processor 1501 can transmit/receive captured images of a customer and/or a created custom three-dimensional model of the customer. Further, through the network interface 1509, the processor 1501 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1501 can be used to connect the computer system 1500 to an external network and transfer data according to standard protocols. For example, various process embodiments disclosed herein can be executed on processor 1501, or can be performed across a network such as the Internet, intranet networks, or local area networks, in conjunction with a remote processor that shares a portion of the processing. In some embodiments, network interface 1509 utilizes wireless technology for connecting to networked devices such as device 501 of FIG. 5. In some embodiments, network interface 1509 utilizes a wireless protocol designed for short distances with low-power requirements. In some embodiments, network interface 1509 utilizes a version of the Bluetooth protocol. Additional mass storage devices (not shown) can also be connected to processor 1501 through network interface 1509.

An auxiliary I/O device interface (not shown) can be used in conjunction with computer system 1500. The auxiliary I/O device interface can include general and customized interfaces that allow the processor 1501 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above and magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 15 is but an example of a computer system suitable for use with the various embodiments disclosed herein. Other computer systems suitable for such use can include additional or fewer subsystems. In addition, bus 1510 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   extracting one or more silhouettes from a series of captured images of a user;
   using a processor to process the captured images to identify a portion of each of the captured images corresponding to the user; and
   modifying parameters of a predetermined three-dimensional human model to fit a modified version of the predetermined three-dimensional human model across the identified portions of the captured images to determine a set of specific parameters representing a body profile of the user, wherein the modified version of the predetermined three-dimensional human model is generated at least in part by matching silhouettes of the modified version of the predetermined three-dimensional human model to the one or more silhouettes of the user.

2. The method of claim 1, wherein the parameters of the predetermined three-dimensional human model include one or more of the following: a height, a width, a leg length, and a hip width parameter.

3. The method of claim 1, wherein the series of captured images of the user includes color data and depth data.

4. The method of claim 1, wherein the identified portions of the captured images corresponding to the user include identified foreground portions of the captured images.

5. The method of claim 1, wherein the identified portions of the captured images corresponding to the user include identified user joint locations of the user.

6. The method of claim 5, wherein the identified user joint locations include shoulder, elbow, wrist, hand, hip, knee, ankle, and foot locations.

7. The method of claim 1, wherein the identified portions of the captured images corresponding to the user include identified facial feature locations of the user.

8. The method of claim 7, wherein the identified facial feature locations include ear locations, eye locations, a nose location, and a mouth location.

9. The method of claim 1, further comprising determining a value identifying a predicted size fit between an item and the user based on the set of specific parameters representing the body profile of the user.

10. The method of claim 9, further comprising selecting and providing the item to the user based on the value identifying the predicted size fit exceeding a threshold value.

11. The method of claim 1, wherein the predetermined three-dimensional human model is based on a sex or an age of the user.

12. The method of claim 1, wherein the predetermined three-dimensional human model includes a spectral decomposition model.

13. The method of claim 1, further comprising:
    identifying two-dimensional joint locations of the user in each of the captured images; and
    fitting three-dimensional joint locations of the predetermined three-dimensional human model based on the identified two-dimensional joint locations.

14. The method of claim 1, further comprising determining an accuracy metric of the modified version of the predetermined three-dimensional human model including by comparing rendered silhouettes of the modified version to silhouette images based on the identified portions of the captured images corresponding to the user.

15. The method of claim 1, further comprising matching a stylist to the user based on attributes of the stylist matching the set of specific parameters representing the body profile of the user.

16. The method of claim 1, further comprising:
    selecting a subset of parameters of the set of specific parameters representing the body profile of the user; and
    identifying a group of users with similar body profiles using the selected subset of parameters.

17. The method of claim 16, further comprising at least in part automatically determining a parameter of a garment sized for the identified group of users.

18. The method of claim 1, further comprising:
    displaying a rendering of the modified version of the predetermined three-dimensional human model to the user; and
    receiving feedback from the user regarding an accuracy rating of the modified version.

19. The method of claim 18, wherein the feedback identifies a portion of the modified version where an additional refinement is desired.

20. The method of claim 19, further comprising receiving one or more additional captured images of the user corresponding to the portion of the modified version where the additional refinement is desired.

21. A computer program product, the computer program product being embodied in a non-transitory computer readable storage medium and comprising computer instructions for:
    extracting one or more silhouettes from a series of captured images of a user;
    processing the captured images to identify a portion of each of the captured images corresponding to the user; and
    modifying parameters of a predetermined three-dimensional human model to fit a modified version of the predetermined three-dimensional human model across the identified portions of the captured images to determine a set of specific parameters representing a body profile of the user, wherein the modified version of the predetermined three-dimensional human model is generated at least in part by matching silhouettes of the modified version of the predetermined three-dimensional human model to the one or more silhouettes of the user.

22. A system, comprising:
    a processor; and a memory coupled with the processor, wherein the memory is configured to provide the processor with instructions which when executed cause the processor to:

extract one or more silhouettes from a series of captured images of a user;

process the captured images to identify a portion of each of the captured images corresponding to the user; and modify parameters of a predetermined three-dimensional human model to fit a modified version of the predetermined three-dimensional human model across the identified portions of the captured images to determine a set of specific parameters representing a body profile of the user, wherein the modified version of the predetermined three-dimensional human model is generated at least in part by matching silhouettes of the modified version of the predetermined three-dimensional human model to the one or more silhouettes of the user.

* * * * *